United States Patent
Kusano et al.

(10) Patent No.: US 6,318,816 B1
(45) Date of Patent: Nov. 20, 2001

(54) VEHICLE BRAKE APPARATUS

(75) Inventors: Akihito Kusano, Toyota; Hiroaki Aizawa; Hiroshi Toda, both of Kariya, all of (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/265,365

(22) Filed: Mar. 10, 1999

(30) Foreign Application Priority Data

Mar. 10, 1998 (JP) .................................................. 10-057884

(51) Int. Cl.$^7$ ........................................................ B60T 8/42
(52) U.S. Cl. ...................................... 303/115.1; 303/116.1
(58) Field of Search .............................. 303/115.1, 3, 10, 303/11, 15, 113.1, 113.4, 115.2, 115.4, 115.5, 116.1, 116.2

(56) References Cited

U.S. PATENT DOCUMENTS

| | | | |
|---|---|---|---|
| 4,957,330 | * 9/1990 | Morikawa et al. | 303/115.4 |
| 5,358,320 | * 10/1994 | Fuchida | 303/116.1 |
| 5,664,849 | * 9/1997 | Burgdorf et al. | 303/116.1 |
| 5,961,188 | * 10/1999 | Sawada | 303/116.1 X |

FOREIGN PATENT DOCUMENTS 58-39551    3/1983   (JP) .
63-64858    3/1988   (JP) .

* cited by examiner

*Primary Examiner*—Robert J Oberleitner
*Assistant Examiner*—Melanie Torres
(74) *Attorney, Agent, or Firm*—Burns, Doane, Swecker & Mathis, LLP

(57) ABSTRACT

A vehicle brake apparatus includes a brake pedal, a wheel brake cylinder operatively mounted on a wheel for applying a braking force to the wheel in proportion to a hydraulic braking pressure, a pressure source for pressurizing brake fluid to generate a hydraulic braking pressure and supply the hydraulic braking pressure to the wheel brake cylinder, and an auxiliary pressure source for pressurizing brake fluid in response to operation of the brake pedal to generate a hydraulic braking pressure and supply the hydraulic braking pressure to the wheel brake cylinder when the pressure source is non-operational. A mechanical valve is operatively mounted between the wheel brake cylinder and the auxiliary pressure source. A first passage is connected between the auxiliary pressure source and the mechanical valve and a second passage is connected between the mechanical valve and the wheel brake cylinder. The mechanical valve permits brake fluid communication between the first and the second passages when the pressure in the first passage is less than a predetermined pressure, and permits brake fluid to flow from the first passage to the second passage when the pressure of the first passage is more than the predetermined pressure.

7 Claims, 7 Drawing Sheets

VEHICLE BRAKE APPARATUS

This application is based on and claims priority under 35 U.S.C. §119 with respect to Japanese Application No. 10(1998)-57884 filed on Mar. 10, 1998, the entire content of which is incorporated herein by reference.

FIELD OF THE INVENTION

The present invention generally relates to a braking system. More particularly, the present invention pertains to a vehicle brake apparatus.

BACKGROUND OF THE INVENTION

Unexamined Published Japanese Patent Applications (Kokai) Nos. 58-39551 and 63-64858 disclose known vehicle brake apparatus that include a brake pedal, a wheel cylinder, a pressure source and a master cylinder. When the pressure source is in the normal condition, the pressure source supplies hydraulic braking pressure to the wheel cylinder in response to operation of the brake pedal. On the other hand, if the pressure source cannot supply hydraulic braking pressure to the wheel cylinder, for example if the pressure source is broken, the master cylinder supplies hydraulic braking pressure to the wheel cylinder. These known apparatus are further defined by an electromagnetic valve which includes a solenoid. The electromagnetic valve is disposed between the master cylinder and the wheel cylinder. The electromagnetic valve is constructed to establish, when the solenoid is deenergized, communication between the master cylinder and the wheel cylinder. When the solenoid is energized, communication between the master cylinder and the wheel cylinder is prevented. As a result, when the pressure source supplies hydraulic braking pressure to the wheel cylinder, the solenoid of the electromagnetic valve is energized to cut off communication between the master cylinder and the wheel cylinder.

However, in the above-described brake apparatus, if the brake pedal is operated for a long period of time to maintain a standstill condition of the vehicle, the solenoid of the electromagnetic valve is also continuously energized for a long period of time. Thus, the electromagnetic valve must be constructed to handle the electricity and so the electromagnetic valve become expensive.

It is possible to address this drawback by constructing the electromagnetic valve so that communication between the master cylinder and the wheel cylinder is prevented when the solenoid is deenergized and to establish communication between the master cylinder and the wheel cylinder when the solenoid is energized. However, the disadvantage here is that communication between the master cylinder and the wheel cylinder cannot be established if the electromagnetic valve is broken and the master cylinder cannot supply hydraulic braking pressure to the wheel cylinder.

In light of the foregoing, a need exists for a vehicle brake apparatus that is not as susceptible to the same disadvantages and drawbacks as those described above.

SUMMARY OF THE INVENTION

In accordance with one aspect of the present invention, a vehicle brake apparatus includes a brake pedal, a wheel brake cylinder operatively mounted on a wheel for applying a braking force to the wheel in proportion to a hydraulic braking pressure, a pressure source for pressurizing brake fluid to generate a hydraulic braking pressure and supply the hydraulic braking pressure to the wheel brake cylinder, and an auxiliary pressure source for pressurizing brake fluid in response to operation of the brake pedal to generate a hydraulic braking pressure and supply the hydraulic braking pressure to the wheel brake cylinder when the pressure source is non-operational. A mechanical valve is operatively mounted between the wheel brake cylinder and the auxiliary pressure source. A first passage is connected between the auxiliary pressure source and the mechanical valve and a second passage is connected between the mechanical valve and the wheel brake cylinder. The mechanical valve permits brake fluid communication between the first and the second passages when the pressure in the first passage is less than a predetermined pressure, and permits brake fluid to flow from the first passage to the second passage when the pressure of the first passage is more than the predetermined pressure.

According to another aspect of the invention, a vehicle brake apparatus includes a brake pedal, a wheel brake cylinder adapted to be operatively mounted on a wheel for applying a braking force to the wheel, a pressure source for pressurizing brake fluid to generate a hydraulic braking pressure and supply the hydraulic braking pressure to the wheel brake cylinder, and an auxiliary pressure source for pressurizing brake fluid in response to operation of the brake pedal to generate a hydraulic braking pressure and supply the hydraulic braking pressure to the wheel brake cylinder when the pressure source is non-operational. A mechanical valve is operatively mounted between the wheel brake cylinder and the auxiliary pressure source, and a first passage connects the auxiliary pressure source to the mechanical valve while a second passage connects the mechanical valve to the wheel brake cylinder. The mechanical valve is designed to permit communication between the first passage and the second passage when a pressure differential between the first passage and the second passage is more than a predetermined pressure, and permits brake fluid flow from the first passage to the second passage when a pressure differential between the first passage and the second passage is less than the predetermined pressure.

BRIEF DESCRIPTION OF THE DRAWING FIGURES

The foregoing and additional features of the present invention will become more apparent from the following detailed description considered with reference to the accompanying drawing figures in which like elements are designated by like reference numerals and wherein.

DETAILED DESCRIPTION OF THE PREFERRED EMBODIMENTS

Figure 1:
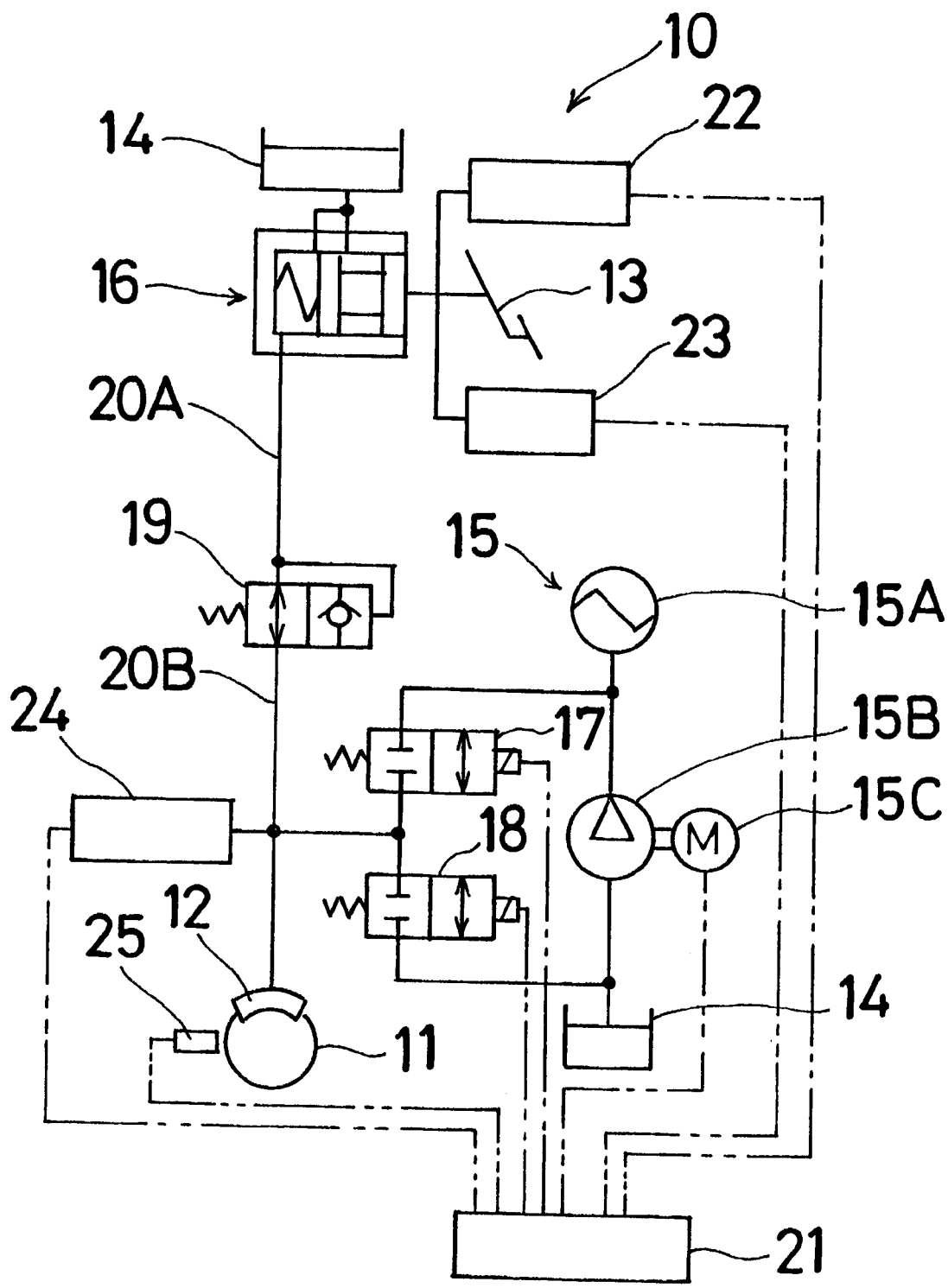
FIG. 1 is a schematic block diagram showing a first embodiment of a vehicle brake apparatus in accordance with the present invention.
Figure 2:
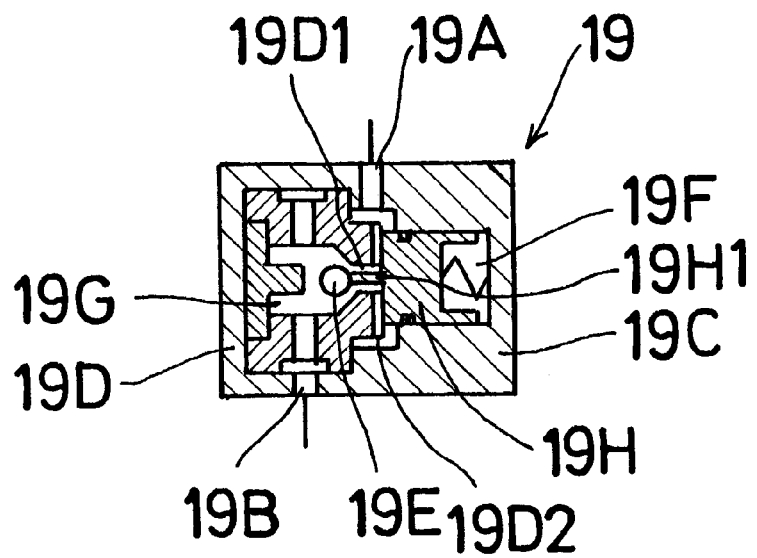
FIG. 2 is a cross-sectional view of the mechanical valve used in the vehicle brake apparatus shown in FIG. 1.

Referring to FIGS. 1 and 2, a vehicle brake apparatus 10 forming a first embodiment of the present invention includes a wheel brake cylinder 12, a brake pedal 13, a reservoir 14, a pressure source 15 and a master cylinder 16. The wheel brake cylinder 12 is operatively mounted on a wheel 11 and applies a braking force to the wheel 11 in proportion to the received hydraulic braking pressure. The reservoir 14 is adapted to hold or store brake fluid and is connected to the pressure source 15. The pressure source 15 pressurizes the brake fluid to generate a hydraulic braking pressure and supply the pressurized hydraulic braking pressure to the wheel brake cylinder 12. The master cylinder 16 pressurizes brake fluid from a reservoir 14' in response to operation of the brake pedal 13 to generate a hydraulic braking pressure and supply the hydraulic braking pressure to the wheel brake cylinder 12, if the pressure source 15 cannot supply the hydraulic braking pressure to the wheel brake cylinder 12.

The pressure source 15 includes an accumulator 15A, an oil pump 15B and an electric motor 15C. The electric motor 15C drives the oil pump 15B. The oil pump 15B draws brake fluid from the reservoir 14 and pressurizes the brake fluid to generate hydraulic braking pressure. The oil pump 15B discharges the pressurized hydraulic braking pressure to the accumulator 15A.

The apparatus shown in FIG. 1 includes two normally closed electromagnetic valves 17, 18. The electromagnetic valve 17 controls the supply of hydraulic braking pressure from the accumulator 15A to the wheel brake cylinder 12 while the electromagnetic valve 18 controls the discharge of hydraulic braking pressure from the wheel brake cylinder 12 to the reservoir 14.

A mechanical valve 19 is disposed between the master cylinder 16 and the wheel brake cylinder 12. The master cylinder 16 and the mechanical valve 19 are connected by a first fluid passage 20A. The mechanical valve 19 and the wheel brake cylinder 12 are connected by a second fluid passage 20B. The mechanical valve 19 shuts off communication between the first fluid passage 20A and the second fluid passage 20B so that hydraulic braking pressure is prevented from being supplied from the master cylinder 16 to the wheel brake cylinder 12 when hydraulic braking pressure is being supplied from the accumulator 15A to the wheel brake cylinder 12.

An electronic control unit 21 controls the operations of the electromagnetic valves 17, 18 and the electric motor 15C. Immediately after the vehicle engine is restarted, the electronic control unit 21 causes the electric motor 15C to rotate for a time such that the electronic control unit 21 assumes the hydraulic braking pressure of the accumulator 15C based on the electric current of the electric motor 15C and causes the hydraulic braking pressure of the accumulator 15A to be within a predetermined range of the hydraulic braking pressure. The electronic control unit 21 further keeps a watch on the pressure source 15 to generate the hydraulic braking pressure and supply the hydraulic braking pressure to the wheel brake cylinder 12.

The apparatus shown in FIG. 1 also includes a braking operation sensor 22, a braking stroke sensor 23 and a pressure sensor 24. The braking operation sensor 22 is adapted to detect the operation of the brake pedal 13 while the braking stroke sensor 23 is adapted to detect the operating condition of the brake pedal 13. The pressure sensor 24 is adapted to detect the hydraulic braking pressure in the second fluid passage 20B. The electronic control unit 21 receives output signals of the braking operation sensor 22, the braking stroke sensor 23 and the pressure sensor 24. The electronic control unit 21 also calculates a target pressure of the hydraulic braking pressure supplied to the wheel brake cylinder 12, and controls the operations of the electromagnetic valves 17, 18 to make the hydraulic braking pressure in the wheel brake cylinder 12 correspond to the target pressure, when the brake pedal 13 is operated and the power source 15 is under the normal condition.

A wheel speed sensor 25 is adapted to detect the wheel speed of the wheel 11. The electronic control unit 21 receives an output signal from the wheel speed sensor 25 to control the so-called antilock brake system. The electronic control unit 21 decreases the hydraulic braking pressure in the wheel brake cylinder 12 in response to the locking condition of the wheel 11, and re-increases the hydraulic braking pressure in the wheel brake cylinder 12 when the locking condition of the wheel 11 no longer exists.

As shown in FIG. 2, the mechanical valve 19 includes a housing 19C having two ports 19A, 19B. The first port 19A is connected with the master cylinder 16 and the second port 19B is connected with the wheel brake cylinder 12. Located within the housing 19C of the mechanical valve 19 is a valve seat member 19D, a check ball 19E, a spring 19F and a piston 19H. The valve seat member 19D is fixed to the housing 19C to define a fluid chamber 19G which communicates with the second port 19B. The valve seat member 19D further includes a passage 19D1 which provides communication between the fluid chamber 19G and the first port 19A. The check ball 19E, which is adapted to close the passage 19D1, is disposed in the fluid chamber 19G. The spring 19F biases the piston 19H towards the valve seat member 19D. The piston 19H is slidably disposed in the housing 19C and is adapted to slide in the rightward direction of FIG. 2 against the biasing force of the spring 19F by the hydraulic braking pressure which is supplied from the master cylinder 16. A rod 19H1 is integrally provided on the piston 19H. The rod 19H1 is able to extend through the passage 19D1 to lift the check ball 19E from the valve seat member 19D to open the passage 19D1. The valve seat member 19D further includes a slit 19D2 which forms a groove between the valve seat member 19D and the piston 19H, when the piston 19H contacts the valve seat member 19D.

Therefore, when the hydraulic braking pressure supplied from the master cylinder 16 is less than a predetermined pressure, the rod 19H1 lifts the check ball 19E to cause the first port 19A and the second port 19B to communicate with each other via the fluid chamber 19G. On the other hand, when the hydraulic braking pressure which is supplied from the master cylinder 16 is more than the predetermined pressure, the piston 19H is urged or slides rightward with reference to the illustration in FIG. 2 against the biasing force of the spring 19F. The check ball 19E is thus able to close the passage 19D1, and brake fluid is only able to flow from the first port 19A to the second port 19B.

When the hydraulic braking pressure of the master cylinder 16 is less than the predetermined pressure, the mechanical valve 19 allows communication between the master cylinder 16 and the wheel brake cylinder 12. Therefore, even if the brake fluid in the wheel brake cylinder 12 is expanded by an increase in the temperature, the hydraulic braking pressure in the wheel brake cylinder 12 does not reach an unusual or excessive pressure. When the hydraulic braking pressure of the master cylinder 16 is more than the predetermined pressure, the wheel brake cylinder 12 is able to receive brake fluid from the master cylinder 16 because the mechanical valve permits one-way flow of the brake fluid. Also, the wheel brake cylinder 12 can receive hydraulic braking pressure from the accumulator 15A via the electromagnetic valve 17 without such pressure flowing into the master cylinder 16. If the power source 15 is not operating under a normal condition, for example the power source 15 is broken, the hydraulic braking pressure, which is supplied to the mechanical valve 19 from the master cylinder 16, lifts the check ball 19E to supply hydraulic braking pressure from the master cylinder 16 to the wheel brake cylinder 12.

The use of a mechanical valve such as that shown in FIG. 2 in connection with a vehicle brake apparatus is quite advantageous in that the cost of manufacturing the mechanical valve 19 is much less than that associated with manufacturing an electromagnetic valve.

Figure 4:
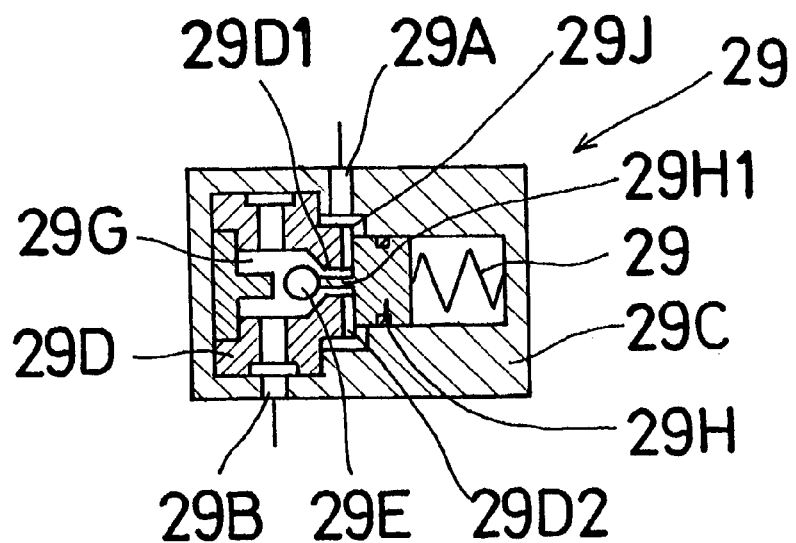
FIG. 4 is a cross-sectional view of the mechanical valve used in the vehicle brake apparatus shown in FIG. 3.
Figure 3:
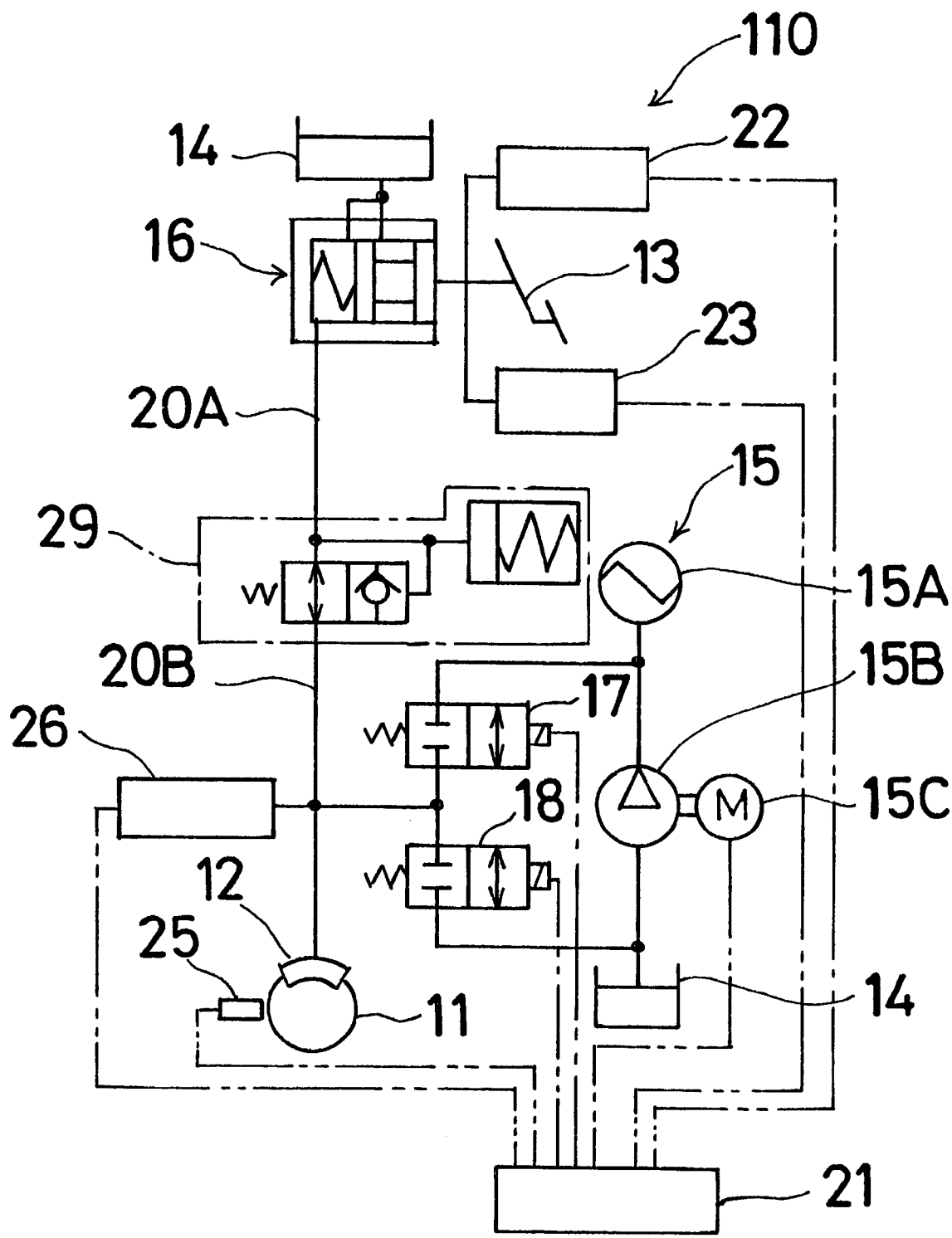
FIG. 3 is a schematic block diagram of a vehicle brake apparatus in accordance with a second embodiment of the present invention.

FIGS. 3 and 4 show a vehicle brake apparatus 110 according to a second embodiment of the present invention and a mechanical valve used in the vehicle brake apparatus 110. The vehicle brake apparatus 110 shown in FIG. 3 differs from that shown in FIG. 1 only with respect to the structure of the mechanical valve 29 of the brake apparatus 110. In FIG. 4, the parts of the mechanical valve 29 that correspond to those shown in FIG. 2 are designated by similar reference numerals except that the prefix "19" is used to designate parts of the embodiment of the mechanical valve in FIG. 2 whereas the prefix "29" is used to designate the same parts of the embodiment of the mechanical valve in FIG. 4.

As shown in FIG. 4, the mechanical valve 29 includes a housing 29C, a valve seat member 29D, a check ball 29E, a spring 29F and a piston 29H. The housing 29C has two ports 29A and 29B. The first port 29A is connected to the master cylinder 16 while the second port 29B is connected to the wheel brake cylinder 12. The valve seat member 29D is fixed to the housing 29C to define a fluid chamber 29G which is communicated with the second port 29B. The valve seat member 29D includes a passage 29D1 providing communication between the fluid chamber 29G and the first port 29A. The check ball 29E, which is able to close the passage 29D1, is disposed in the fluid chamber 29G. The piston 29H is slidably disposed in the housing 29C and the spring 29F biases the piston 29H toward the valve seat member 29D. The piston 29H is urged or slid in the rightward direction with reference to the illustration in FIG. 4 against the biasing force of the spring 29F by the hydraulic braking pressure which is supplied from the master cylinder 16 so that the cubic or volumetric capacity of a fluid chamber 29J is increased. A rod 29H1 is integrally provided on the piston 29H. The rod 29H1 is able to extend into and through the passage 29D1, and can lift the check ball 29E from the valve seat member 29D to open the passage 29D1. The valve seat member 29D further includes a slit 29D2 which forms a groove between the valve seat member 29D and the piston 29H when the piston 29H contacts the valve seat member 29D.

Therefore, when the hydraulic braking pressure in the fluid chamber 29J is less than a predetermined pressure, the rod 29H1 lifts the check ball 29E so that the first port 29A and the second port 29B are communicated with each other via the fluid chamber 29G. On the other hand, when the hydraulic braking pressure in the fluid chamber 29J is more than the predetermined pressure, the piston 29H is urged or slid rightward with reference to the FIG. 4 illustration against the biasing force of the spring 29F, and the check ball 29E closes the passage 29D1 so that brake fluid can only flow from the first port 29A to the second port 29B. In addition, the piston 29H can be slid to increase the cubic or volumetric capacity of the fluid chamber 29J so that it is possible to obtain a desired stroke of the brake pedal 13. As a result, the brake pedal operating feeling is improved.

Figure 5:
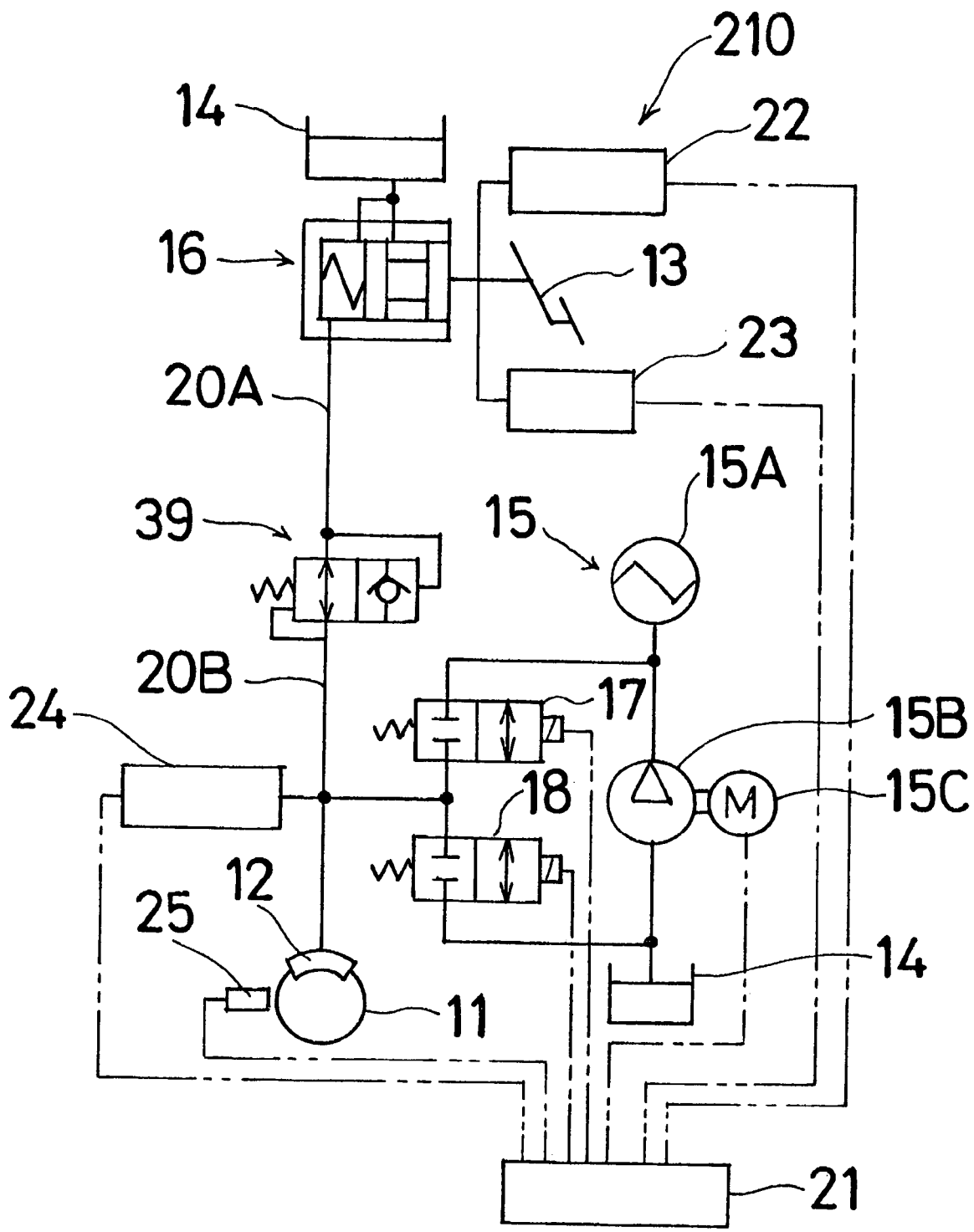
FIG. 5 is a schematic block diagram of a vehicle brake apparatus in accordance with a third embodiment of the present invention.
Figure 6:
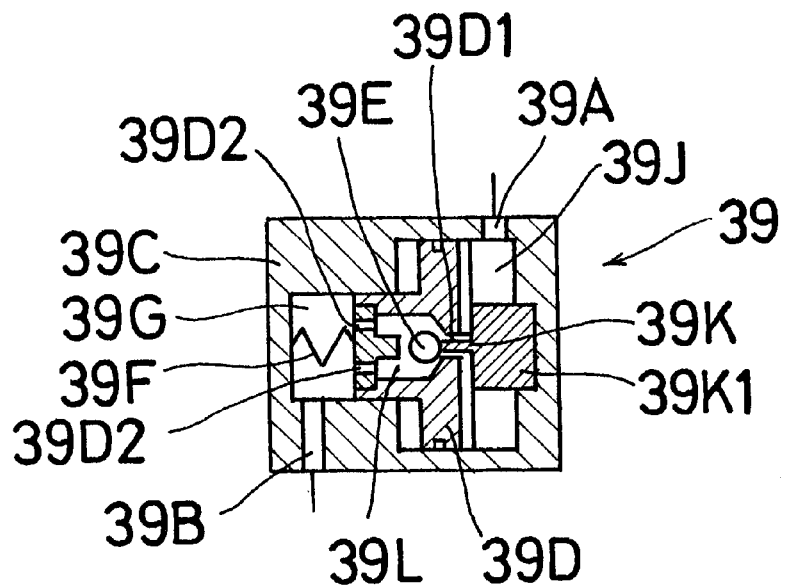
FIG. 6 is a cross-sectional view of the mechanical valve used in the vehicle brake apparatus shown in FIG. 5.
Figure 7:
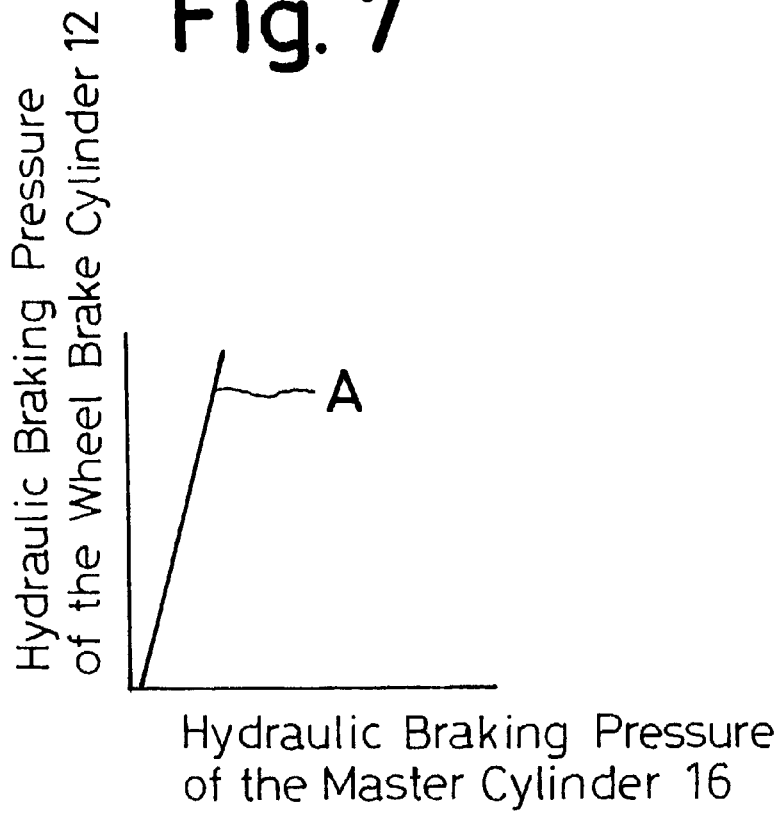
FIG. 7 is a graph showing the braking pressure characteristics associated with the mechanical valve illustrated in FIG. 6.

FIGS. 5 to 7 show a vehicle brake apparatus 210 according to a third embodiment of the present invention and a mechanical valve 39 used in the vehicle brake apparatus 210. The vehicle brake apparatus 210 shown in FIG. 3 differs from that shown in FIG. 1 only with respect to the structure of the mechanical valve 39 of the brake apparatus 210. In FIG. 6, the parts of the mechanical valve 39 that correspond to those shown in FIG. 2 are designated by similar reference numerals except that the prefix "19" is used to designate parts of the embodiment of the mechanical valve in FIG. 2 whereas the prefix "39" is used to designate the same parts of the embodiment of the mechanical valve in FIG. 6.

As shown in FIG. 6, the mechanical valve 39 includes a housing 39C, a valve seat member 39D, a check ball 39E, a spring 39F and a rod 39K. The housing 39C has two ports 39A, 39B. The first port 39A is connected with the master cylinder 16, and the second port 39B is connected with the wheel brake cylinder 12. The valve seat member 39D is slidably disposed in the housing 39C and is configured to define a chamber 39L. The spring 39F is disposed in a fluid chamber 39G which is in communication with the second port 39B. The spring 39F biases the valve seat member 39D in the rightward direction with reference to the illustration in FIG. 6. A fluid chamber 39J is disposed on the side of the valve seat member 39D opposite the fluid chamber 39G. The fluid chamber 39J is in communication with the first port 39A. The valve seat member 39D further includes a passage 39D1 and two passages 39D2. The chamber 39L communicates with the fluid chamber 39J via the passage 39D1 and is able to communicate with the fluid chamber 39G via the passages 39D2. The valve seat member 39D is adapted to slide toward the left with reference to the illustration in FIG. 6 against the biasing force of the spring 39F by virtue of hydraulic braking pressure supplied from the master cylinder 16. The check ball 39E is disposed in the chamber 39L and is adapted to close the passage 39DI. The rod 39K is integrally provided with a stopper 39K1 which is fixed to the housing 39C. The rod 39K is thus able to extend through the passage 39D1 to lift the check ball 39E from the valve seat member 39D for opening the passage 39D1.

FIG. 7 is a graph which shows the relationship between the hydraulic braking pressure of the master cylinder 16 and the hydraulic braking pressure of the wheel brake cylinder 12. When the hydraulic braking pressure of the wheel cylinder 12 as compared to the hydraulic braking pressure of the master cylinder 16 is more than a predetermined pressure as defined by the line A in FIG. 7 (i.e., when the pressure differential between the hydraulic braking pressure of the wheel cylinder 12 and the hydraulic braking pressure of the master cylinder 16 is more than the predetermined pressure), the mechanical valve 39 is positioned to provide communication between the first port 39A and the second port 39B. On the other hand, when the hydraulic braking pressure of the wheel cylinder 12 as compared to the hydraulic braking pressure of the master cylinder 16 is less than the predetermined value as defined by the line A in FIG. 7 (i.e., when the pressure differential between the hydraulic braking pressure of the wheel cylinder 12 and the hydraulic braking pressure of the master cylinder 16 is less than the predetermined pressure), the mechanical valve 3 permits the flow of brake fluid from the first port 39A to the second port 39B, but restricts or prevents the flow of brake fluid from the second port 39B to the first port 39A. In this situation, the hydraulic braking pressure supplied to the wheel brake cylinder 12 from the pressure source 15 is less than the predetermined value defined by the line A in FIG. 7.

In this third embodiment of the present invention, by virtue of the characteristic of the mechanical valve 39 represented by the graph in FIG. 7, the hydraulic braking pressure of the wheel brake cylinder 12 decreases in proportion to a decrease in the hydraulic braking pressure of the master cylinder 19.

Figure 8:
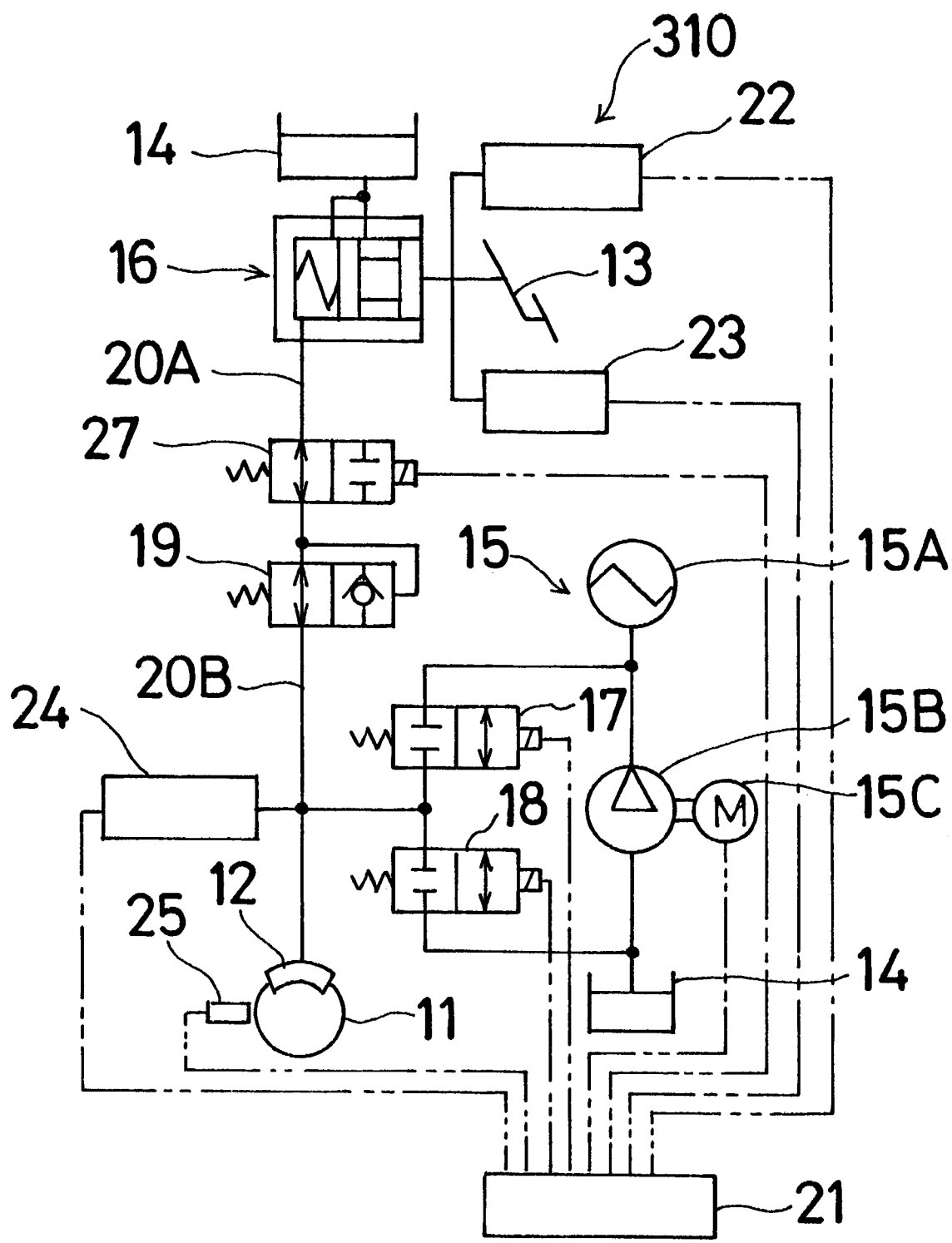
FIG. 8 is a schematic block diagram of a vehicle brake apparatus in accordance with a fourth embodiment of the present invention.

FIG. 8 shows a vehicle brake apparatus 310 according to a fourth embodiment of the present invention. The brake apparatus 310 shown in FIG. 8 is similar to the embodiment shown in FIG. 1 except that the embodiment depicted in FIG. 8 also includes a normally opened electromagnetic valve 27. The features of the vehicle brake apparatus 310 shown in FIG. 8 that correspond to the features of the embodiment shown in FIG. 1 are designated by the same reference numerals.

As shown in FIG. 8, the electromagnetic valve 27 is disposed in the first fluid passage 20A that extends between the master cylinder 16 and the mechanical valve 19. The electromagnetic valve 27 is changed to the closed position to shut off fluid communication between the master cylinder 16 and the wheel brake cylinder 12 when the electronic control unit 21 controls the antilock brake system. The electromagnetic valve 27 is further changed to the closed position when the pressure source 15 is to supply hydraulic braking pressure to the wheel cylinder 12 in case the brake pedal 13 is operated under the condition where the hydraulic braking pressure of the master cylinder 16 is less than the predetermined pressure. In addition, the electromagnetic valve 27 is changed to the closed position when traction control, over-steer preventing control, or under-steer preventing control are being effected under conditions in which the brake pedal 13 is not being operated. It is to be understood that the electromagnetic valve 27 can be disposed in the second fluid passage 20B that extends between the mechanical valve 19 and the wheel cylinder 12.

Figure 9:
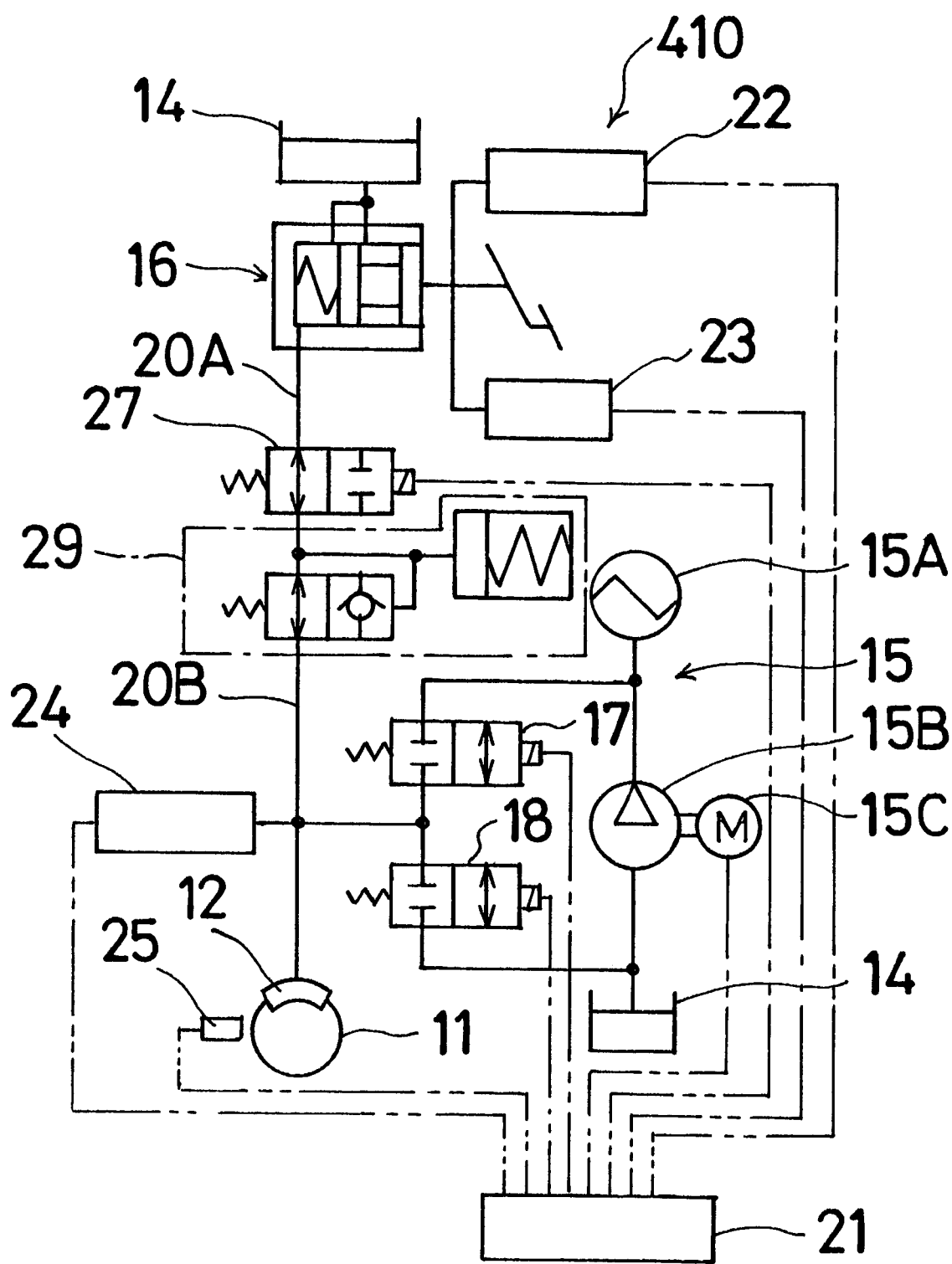
FIG. 9 is a schematic block diagram of a vehicle brake apparatus in accordance with a fifth embodiment of the present invention.

FIG. 9 shows a vehicle brake apparatus 410 according to a fifth embodiment of the present invention. The brake apparatus 410 shown in FIG. 9 is similar to the second embodiment shown in FIGS. 3 and 4 except that the embodiment depicted in FIG. 9 also includes a normally opened electromagnetic valve 27. The features of the vehicle brake apparatus 410 shown in FIG. 9 that correspond to the features of the embodiment shown in FIGS. 3 and 4 are designated by the same reference numerals. The operation of the electromagnetic valve 27 in the fifth embodiment of the invention shown in FIG. 9 is the same in FIG. 8. Once again, it is also possible to dispose the electromagnetic valve 27 in the second fluid passage 20B.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims be embraced thereby.

What is claimed is:

1. A brake apparatus for a vehicle having a brake pedal, comprising:

a wheel brake cylinder adapted to be operatively mounted on a wheel for applying a braking force to the wheel;

a pressure source for pressurizing brake fluid to generate a hydraulic braking pressure and supply the hydraulic braking pressure to the wheel brake cylinder;

an auxiliary pressure source for pressurizing brake fluid in response to operation of the brake pedal to generate a hydraulic braking pressure and supply the hydraulic braking pressure to the wheel brake cylinder when the pressure source is non-operational;

a mechanical valve operatively mounted between the wheel brake cylinder and the auxiliary pressure source, said mechanical valve including a first port and a second port;

a first passage connected between the auxiliary pressure source and the first port of the mechanical valve; and a second passage connected between the second port of the mechanical valve and the wheel brake cylinder, said mechanical valve being selectively positionable in a first operating condition in which fluid flow is simultaneously permitted from the first port to the second port and from the second port to the first port, and a second operating condition in which fluid flow from the first port to the second port is permitted and fluid flow from the second port to the first port is prevented, said mechanical valve being positionable in said first and second operational conditions based on at least the pressure at said first port.

2. The vehicle brake apparatus according to claim 1, wherein the auxiliary pressure source includes a master cylinder.

3. A brake apparatus of vehicles in claim 1, further comprising an electromagnetic valve disposed in the first passage for opening and closing the first passage.

4. The vehicle brake apparatus according to claim 1 wherein said mechanical valve includes a housing in which is movably disposed a valve seat member, said valve seat member having a space in which is positioned a check ball, said valve seat member being biased by a spring in a first direction, and including a rod adapted to extend through a hole in said valve seat member to engage the check ball and place the mechanical valve in the first operational condition when the pressure at the first port is less than a predetermined pressure.

5. The vehicle brake apparatus according to claim 1, wherein said mechanical valve includes a housing in which is disposed a valve seat member and a movable piston, said valve seat member defining a fluid chamber and being provided with a passage communicating with the fluid chamber, including a check ball disposed in the fluid chamber for closing the passage, said piston being biased by a spring towards the valve seat member, a portion of said piston being adapted to extend through said housing and engage the check ball to open the passage when the pressure at the first port is less than a predetermined pressure.

6. The vehicle brake apparatus according to claim 5, wherein said fluid chamber is a first fluid chamber and including a second fluid chamber between the valve seat member and the piston.

7. The vehicle brake apparatus according to claim 1, wherein said mechanical valve includes a housing in which is movably disposed a valve seat member, said valve seat member having a space in which is positioned a check ball, said valve seat member being biased by a spring in a first direction, and including a rod adapted to extend through a hole in said valve seat member to engage the check ball when the pressure in the first passage is less than the predetermined pressure.

* * * * *